UNITED STATES PATENT OFFICE.

CHARLES R. FOLSOM, OF SOUTH BEND, INDIANA.

WHEEL-FENDER.

968,239.  Specification of Letters Patent.  Patented Aug. 23, 1910.

Application filed June 25, 1909. Serial No. 504,375.

*To all whom it may concern:*

Be it known that I, CHARLES R. FOLSOM, a citizen of the United States, residing at the city of South Bend, county of St. Joseph, State of Indiana, have invented certain new and useful Improvements in Wheel - Fenders, of which the following is a specification.

This invention relates to improvements in wheel fenders.

The main object of this invention is to provide an improved fender which may be made of light material, and, at the same time, very strong and rigid, and is massive and strong in appearance.

Further objects, and objects relating to structural details, will definitely appear from the detailed description to follow.

I accomplish the objects of my invention by the devices and means described in the following specification. The structure described constitutes one effective embodiment of my invention. Other embodiments would be readily devised by those skilled in the art.

The invention is clearly defined and pointed out in the claim.

A structure constituting an effective and preferred embodiment of the features of my invention is clearly illustrated in the accompanying drawing, forming a part of this specification, in which:—

Figure 1:
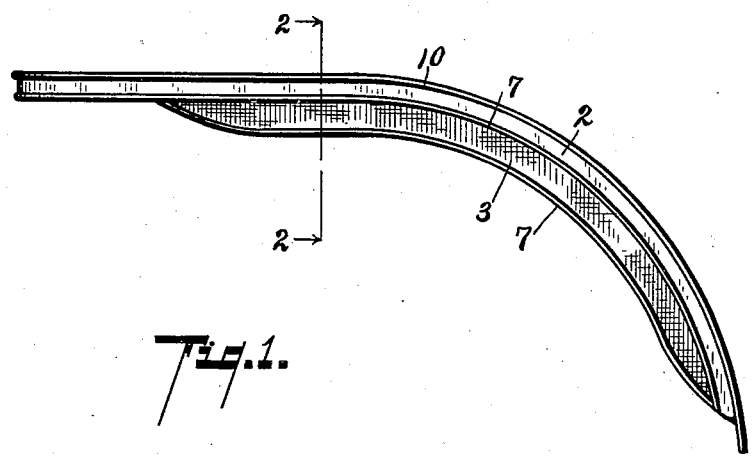
Figure 2:
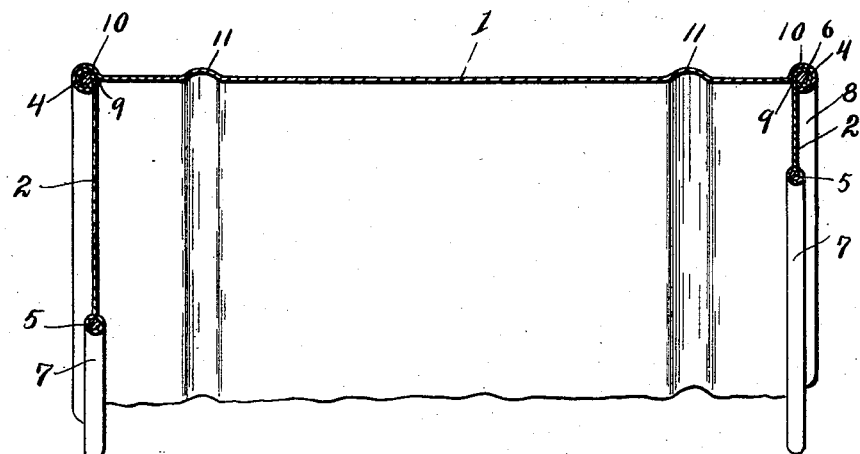

Figure 1 is a side elevation of a structure embodying the features of my invention. Fig. 2 is an enlarged detail cross section thereof, taken on a line corresponding to line 2—2 of Fig. 1, looking in the direction of the little arrows at the ends of the section lines.

In the drawing, the similar numerals of reference refer to similar parts throughout both views.

Referring to the drawing, my improved fender consists of a top portion 1 and rim portion 2, the rim portion being preferably extended down at 3 on one side to form what is commonly designated as the apron of the fender. The top and rim portions are formed of sheet metal, and suitably shaped to conform to the purpose, the fender illustrated being the left-hand rear fender of an automobile.

The edges of the rim are wired, the top and bottom edge wires 4 and 5, respectively, being secured by forming bead-like rolls 6 and 7 in the rim to receive the same. The upper edge wire is on the outer side of the rim, thereby securing a substantially flat inside face for the rim. The rim is secured to the top by seaming the top over the upper edge wire, as clearly appears in Fig. 2, the seam being bead-like in form and being turned downwardly and inwardly over the edge wire, and its securing bead of the rim. This securing seam 8 is struck up from the upper surface of the fender, thereby forming a shoulder at 9 against which the rim rests, and is clamped by means of the seam, the inner edge of the seam being preferably folded close against the outer side of the rim, as is clearly illustrated in Fig. 2, thereby securely clamping the rim in place.

The seam, being struck up from the surface, forms a bead-like upwardly-projecting rib 10 for the edge of the fender, lending to the same a strong, massive appearance. I also provide the fender with longitudinal shifting ribs 11 struck up from the metal adjacent to and parallel with the edge, thereby strengthening the same and adding to its massive appearance. This stiffening of the fender at this point coacts with the shoulder 9 and makes a very rigid structure and avoids indentation at the angle between the fender and the flange that would open the seam unless a very heavy blow is received that would destroy the whole structure.

By thus forming the parts, and securing them together, a structure which is very strong and rigid is secured, although it may be formed of comparatively light material. The parts serve to brace one another and are connected so that it is quite impossible that they should become disconnected without such an injury as would practically destroy the fender.

The structure is economical to produce, both in the matter of cost of material and in labor in forming and assembling the parts, and it is, as stated, when assembled, very strong and rigid and has a strong massive appearance.

Having thus described my invention, what I claim as new and desire to secure by Letters Patent, is:

A sheet - metal fender comprising a top portion with a stiffening rib struck up near its edge, a downwardly - projecting flange-like rim portion, and a bead wire, said bead wire being folded in the upper edge of said flange portion, said wire being arranged toward the outside, the said top portion and flange portion being connected together by a seam over the upper edge of the said flange embracing the said bead wire and extending above the upper surface of said top portion, thereby forming a shoulder against which said flange rests, whereby the said joint is reinforced by the proximity of the stiffening rib to said shoulder, as specified.

In witness whereof, I have hereunto set my hand and seal in the presence of two witnesses.

CHARLES R. FOLSOM. [L. S.]

Witnesses:
J. F. FOLSOM,
CHRISTINE FRANZ.